(12) United States Patent
Bartos

(10) Patent No.: US 6,554,299 B1
(45) Date of Patent: Apr. 29, 2003

(54) DETACHABLE WHEELS FOR A GOLF BAG

(76) Inventor: Roma J. Bartos, 8 Wickatunk Rd., Manalapan, NJ (US) 07726

( * ) Notice: Subject to any disclaimer, the term of this patent is extended or adjusted under 35 U.S.C. 154(b) by 0 days.

(21) Appl. No.: 10/082,445

(22) Filed: Feb. 23, 2002

(51) Int. Cl.⁷ .................................................. B62B 1/04
(52) U.S. Cl. ............................... 280/47.26; 280/47.18; 280/43.1; 280/DIG. 6
(58) Field of Search ........................... 280/47.26, 47.18, 280/DIG. 6, 47.24, 47.41, 638, 43.1; 301/132, 134, 135

(56) References Cited

U.S. PATENT DOCUMENTS

| | | | | |
|---|---|---|---|---|
| 262,973 A | * | 8/1882 | Nilson | 267/272 |
| 2,443,900 A | * | 6/1948 | Evans | 267/272 |
| 4,836,505 A | | 6/1989 | Catalo | |
| 6,056,301 A | | 5/2000 | Berliner et al. | |
| 6,068,270 A | | 5/2000 | Kim | |
| 6,139,047 A | | 10/2000 | Kim | |
| 6,186,520 B1 | | 2/2001 | Barten | |
| 6,279,926 B1 | * | 8/2001 | Taube et al. | 280/47.26 |
| 6,299,183 B1 | * | 10/2001 | Kaneko | 280/47.26 |

* cited by examiner

Primary Examiner—Avraham Lerner
(74) Attorney, Agent, or Firm—Ira M. Adler, Esq.

(57) ABSTRACT

The present invention relates to a wheel axle which can easily be attached to and detached from a golf bag.

1 Claim, 2 Drawing Sheets

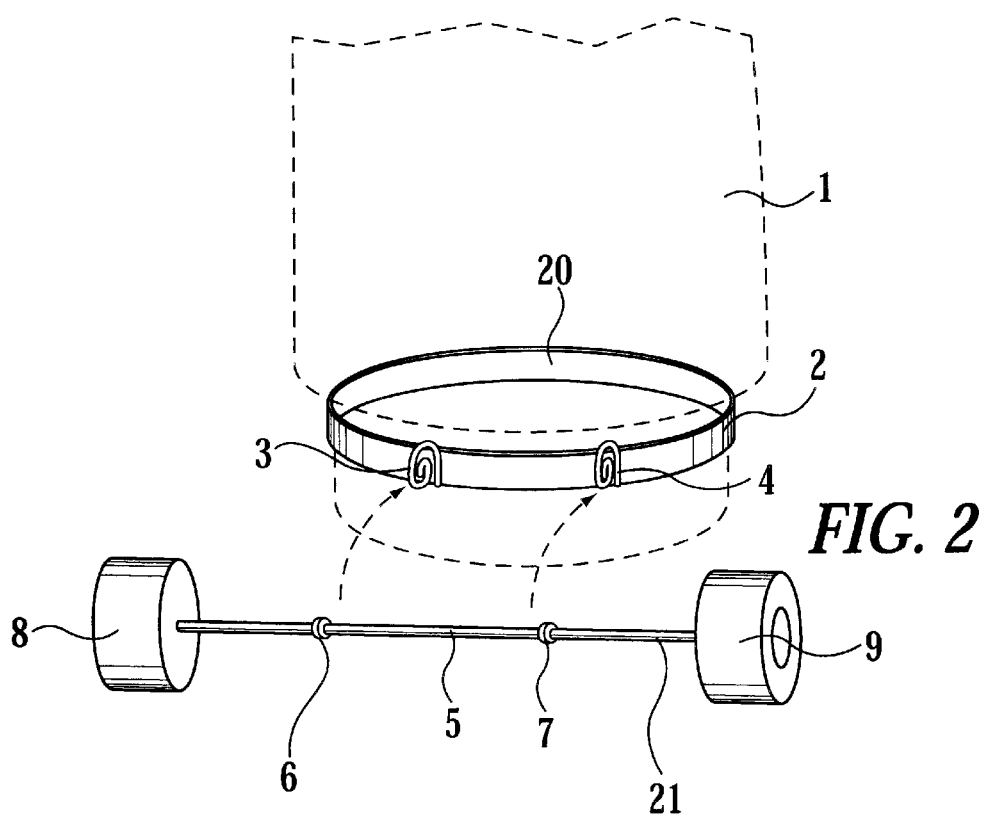
FIG. 2
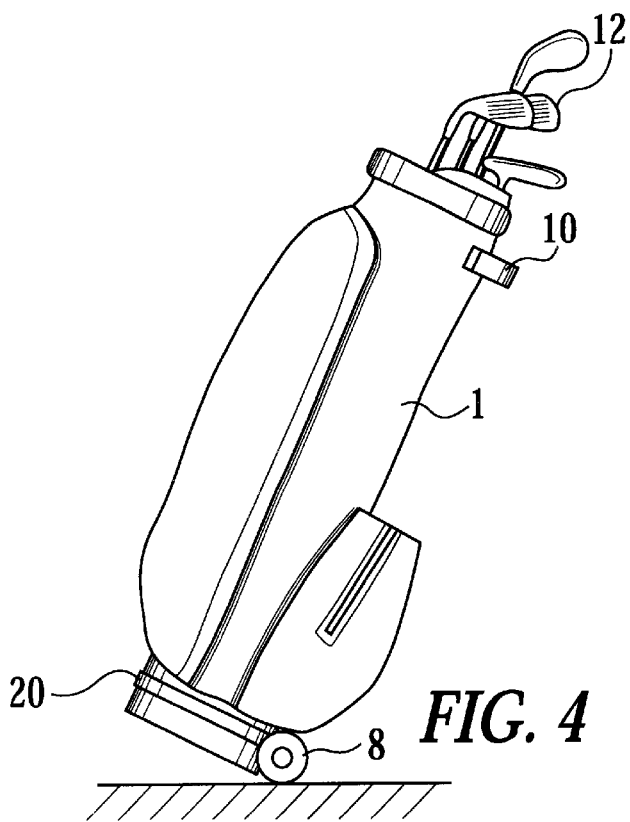
FIG. 3
FIG. 4

DETACHABLE WHEELS FOR A GOLF BAG

FIELD OF THE INVENTION

The present invention relates to a mechanism to easily attach and detach an axle holding wheels to a golf bag to permit easy movement of a golf bag for short distances.

BACKGROUND OF THE INVENTION

While numerous prior inventions have taught lightweight and portable golfbags, such as Liao et al., U.S. Pat. Nos. 5,112,068 and 6,139,047 which, although has removable wheels, requires a complex mechanism at attach and detach the wheels. Similarly, Barton, U.S. Pat. No. 6,186,520 also shows a complex collapsing means.

Several other patents, such as Berliner et al, U.S. Pat. No. 6,056,301 and Catalo, U.S. Pat. No. 4,835,565.

The present invention overcomes the shortcomings of the above by allowing a lightweight and simple means of attaching and detaching the wheels.

OBJECTS OF THE INVENTION

It is an object of the present invention, therefore, to provide means of easily transporting a golf bag with clubs from a player's vehicle to a motorized golf cart. Another object is to allow the golfer to easily assemble and attach the wheels to the golf bag and then to store the assembly during golf play.

BRIEF DESCRIPTION OF THE DRAWINGS

These and other features of the present invention will be more clearly understood from a consideration of the following description, taken in connection with the accompanying drawings, in which:

FIG. 2 is a perspective view of the golf bag strap attaching to the axle;

FIG. 3 is a close up cross section of the golf bag strap;

FIG. 4 is an elevation view of the golf bag with attached wheels, showing the golfbag strap.

DETAILED DESCRIPTION OF THE DRAWINGS

Figure 1:
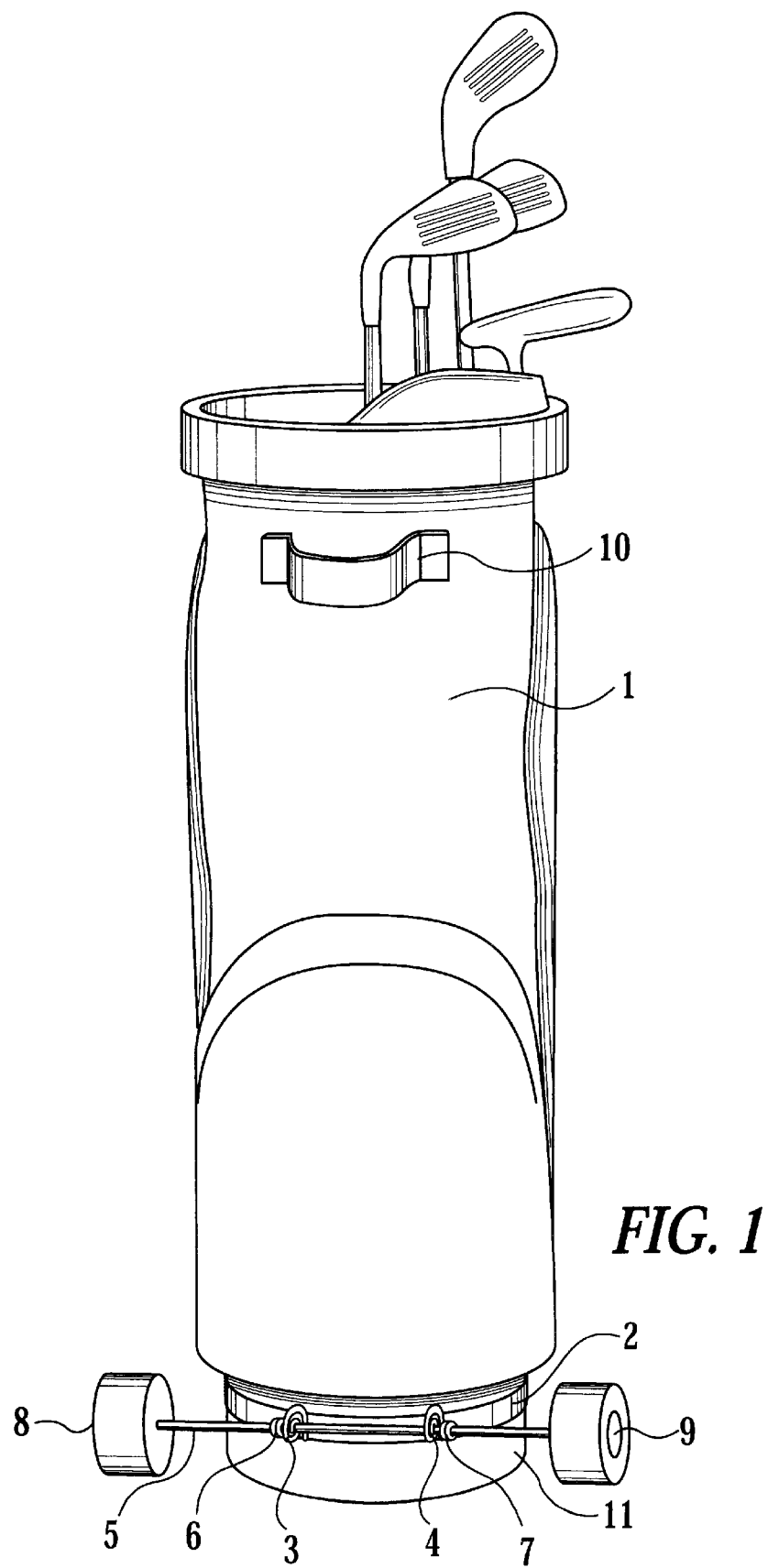
FIG. 1 is a perspective view of a golf bag with attached wheels, showing the golf bag strap.

Referring to the drawings of the invention, as seen in FIG. 1, which shows many of the elements of the invention. As seen, a golf bag strap, 2, encircles the base, 11, of a golf bag, 1. A right and a left axle clip, 3 & 4, respectively, are affixed to the golf bag strap, 2. The axle clips, 3 & 4, respectively, made of a spring-like material, encircle a wheel axle, 5. A left axle stop, 6, and a right axle stop, 7, keeps the axle from moving laterally. Said wheel axle, 5, has a left wheel, 8, and a right wheel, 9, peripherally attached at each end. A convenient handle, 10, usually is affixed near the upper top of the golf bag.

FIG. 2 shows the golf bag strap, 20, detached from the axle assembly, 21. In use, the axle assembly is clipped, onto the left axle clip, 3, and the right axle clip, 4. The golf bag and clubs can be wheeled, typically from a player's automobile to a player's motor cart. Once the bag and clubs are mounted on the cart, the axle assembly can be removed and stored.

Similarly, at the end of a round of golf, the axle assembly can be clipped to the axle clips to be wheeled to the player's automobile, then unclipped for storage in the automobile, if necessary 2.

FIG. 3 is a close up of an axle clip, 7. As clearly seen, the clip, 7, is affixed to the golf bag strap, 2. The clip is in the form of a spiral. In other embodiments of the invention, the clip may be in the form of any arc. In practice, one clip has a cross section which is thicker at the end attached to the strap and progressively narrow to its end. The axle, 5, fits into the center of the clip.

FIG. 4 shows a golf bag, 1, containing golf clubs, 12, having the strap assembly, 20, attached to the base of the golf bag, 1, in a position such that it can be wheeled using an attached wheel, 8.

What I claim is:

1. A detachable wheel axle and end wheels for transporting a golf bag, consisting of:

a) A bag strap encircling the golf bag;

b) A pair of clips, having one end adjacent to the bag strap and attached to the bag strap and an unattached other end, whereby the pair of clips are in the form of a spiral of approximately 540° such that it has a cross section thicker at the end adjacent to the bag strap and progressively narrows to the other end, thereby permitting insertion and removal of the axle;

c) A wheel axle removably clipped to the clips;

d) A pair of wheels affixed to the outer ends of the wheel axle.

* * * * *